(12) United States Patent
Kirchhoffer et al.

(10) Patent No.: US 6,301,538 B1
(45) Date of Patent: Oct. 9, 2001

(54) SWAP SHIFT MULTIPLE-RATIO AUTOMATIC TRANSMISSION

(75) Inventors: Johann Kirchhoffer, Cologne (DE); Robert Clay Haase, Southfield; Scott Raymond Crandall, Wixon, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/589,506

(22) Filed: Jun. 7, 2000

(51) Int. Cl.[7] ................................................. F16H 61/04
(52) U.S. Cl. ................................ 701/51; 701/61; 701/67; 192/3.29; 192/3.33; 475/120; 475/59; 475/152
(58) Field of Search ....................... 707/51, 55, 56, 707/58, 60, 61, 62, 64; 192/3.33, 3.29; 477/39, 46, 50, 78, 152

(56) References Cited

U.S. PATENT DOCUMENTS

| | | | |
|---|---|---|---|
| 5,542,889 | * 8/1996 | Pierce et al. | 475/275 |
| 5,642,283 | 6/1997 | Schulz et al. | 701/51 |
| 5,646,842 | 7/1997 | Schulz et al. | 701/51 |
| 5,722,519 | 3/1998 | Kirchhoffer et al. | 192/3.3 |
| 5,809,442 | 9/1998 | Schulz et al. | 701/51 |
| 5,835,875 | 11/1998 | Kirchhoffer et al. | 701/51 |
| 6,007,445 | 12/1999 | Kirchhoffer | 475/116 |
| 6,122,583 | * 9/2000 | Kirchhoffer et al. | 701/51 |

* cited by examiner

Primary Examiner—William A. Cuchlinski, Jr.
Assistant Examiner—Marthe Marc-Coleman
(74) Attorney, Agent, or Firm—Frank G. McKenzie (57) ABSTRACT

A multiple-ratio automatic transmission comprising a first multiple-ratio gear unit and a second simple planetary gear unit arranged in series in a torque flow path, each gear unit having a reaction brake that can be selectively activated and deactivated to effect a ratio change as the first gear unit is upshifted and the second gear unit is downshifted, ratio changes in each gear unit being effected by pressure-operated clutches and brakes, the brakes having opposed pressure-apply and pressure-release chambers. Separate exhaust flow paths are provided for a reaction brake release chamber and for a companion pressure-operated clutch. A pressure modifier valve circuit is provided for increasing the rate of response to a command for applying and releasing the clutch.

7 Claims, 11 Drawing Sheets

| MANUAL LEVER POSITION | | | FRICTION AND REACTION ELEMENTS | | | | | | | | | | SHIFT SOLENOID STAGES | | | | |
|---|---|---|---|---|---|---|---|---|---|---|---|---|---|---|---|---|---|
| | | | CL1 | B1 | OWC1 | CL2 | B2 | CL3 | B3 | OWC2 | CC | SS1 | SS2 | SS3 | SS4 | PWM |
| D | DRIVE | 1st | ◤ | | ▩ | | | ▩ | | ▩ | | ▩ | | | ◤ | ◤ |
| | | 2nd | | ▩ | | | ▩ | ▩ | | | | ▩ | | ▩ | ◤ | ◤ |
| | | IS3 | ◤ | | | | ▩ | ▩ | | | | ▩ | | ▩ | ◤ | ◤ |
| | | 3RD | ◤ | | | ▩ | | ▩ | | | | ▩ | | | ◤ | ◤ |
| | | IS1 | ◤ | | | ▩ | | ▩ | | | | | ▩ | | ◤ | ◤ |
| | | IS2 | ◤ | | | ▩ | | ▩ | | | | | ▩ | ▩ | ◤ | ◤ |
| | | 4th ODC SWITCH = OFF | | | | ▩ | | ▩ | | | ◤ | | ▩ | ▩ | | ◤ |
| | | 4th ODC SWITCH = ON | | | | ▩ | | ▩ | | | ◤ | | ▩ | ▩ | | ◤ |
| | | 5th | | | | ▩ | | | ▩ | | ◤ | | ▩ | ▩ | | |
| 2 | MAN2 | 3rd +OD | ▩ | | | | | ▩ | | | | | ▩ | ▩ | | |
| | | *3rd | ▩ | | | | | ▩ | | | | ▩ | | ▩ | | |
| 1 | MAN1 | 3rd +OD | ▩ | | | | | ▩ | | | | | ▩ | ▩ | | |
| | | 3rd | ▩ | | | | | ▩ | | | | ▩ | | ▩ | | |
| | | 1st | ▩ | | | | | ▩ | | ▩ | | ▩ | | | | |

SHIFT SOLENOID = ENERGIZED OR CLUTCH ENGAGED ▩

SHIFT SOLENOID IS = DE-ENERGIZED OR CLUTCH IS RELEASED ☐

CLUTCH OR SOLENOID CAN BE ENERGIZED OR DE-ENERGIZED = DEPENDING ON VEHICLE OPERATING CONDITION ◤

* = HYDRAULICALLY LOCKED

SWAP SHIFT MULTIPLE-RATIO AUTOMATIC TRANSMISSION

TECHNICAL FIELD

The invention relates to a multiple-ratio transmission for an automotive vehicle comprising separate planetary gear units with separate reaction brakes that are applied and released to effect an overall upshifting and downshifting.

BACKGROUND ART

U.S. Pat. No. 5,835,875, filed by the present inventors, which is owned by the assignee of the present invention, discloses a powertrain with planetary gearing, including clutches and brakes that are controlled by a control system with features that are common to the present invention. The transmission of the '875 patent comprises a first compound planetary gear unit with three forward-driving ratios, commonly referred to as a Simpson gearset, and a second gear unit at the torque input side of the first gear unit. Separate pressure-operated clutches and brakes effect upshifting and downshifting. A friction brake for the reaction element of the second gear unit establishes a torque reaction, and an overrunning coupling establishes a torque flow path between two elements of the second gear unit as the friction brake for the second gear unit is released.

Ratio changes in the gearing of the '875 patent are controlled by an electronic microprocessor controller which develops control signals in response to changes in operating variables of the powertrain to actuate four shift solenoids, which in turn control shift valves for actuating and releasing the pressure-operated brakes and clutches.

On a ratio change from the second ratio to the third ratio, it is necessary to exhaust pressure from the apply side of the reaction brake for the second gear unit and from the release side of the reaction brake for the first gear unit. Thus, the brake for the first gear unit becomes applied, and the brake for the second gear unit becomes released in a so-called "swap shift" sequence.

The pressure exhaust flow path for the reaction brake for the first gear unit is combined with a circuit for the clutch for the first gear unit, which is engaged during fourth ratio operation. As the release side of the brake for the first gear unit is depressurized, the apply side of the brake is pressurized. This creates a condition in which a pressure buildup may occur in the clutch because of the common exhaust port for the clutch and the brake located in the clutch circuit. Further, it is necessary in a control system such as that disclosed in the '875 patent to increase the rate of response of the clutch for the first gear unit to commands for clutch engagement and clutch release as ratio changes occur between the fourth ratio and the second ratio or between second ratio and fourth ratio.

DISCLOSURE OF INVENTION

The transmission of the present invention comprises a multiple-ratio Simpson-type gear unit and a simple planetary gear unit arranged in series relationship in an automotive vehicle powertrain. The simple planetary gear unit is located at the torque input side of the multiple-ratio gear unit. A reaction brake for the simple planetary gear unit is applied to effect upshifting of the simple planetary gear unit. An overrunning coupling establishes a one-to-one driving ratio in the simple planetary gear unit when the reaction brake is released.

The multiple-ratio gear unit has a reaction element for anchoring common sun gears of the multiple-ratio gear unit when the transmission is operating in the second forward-driving ratio. When the transmission is operating in the fourth forward-driving ratio, a pressure-operated friction clutch for the multiple-ratio gear unit is applied as the companion brake is released.

An upshift from the second ratio to the third ratio is achieved by disengaging the brake for the simple planetary gear unit and applying the brake for the multiple-ratio gear unit. This is a so-called reaction brake interchange, which effects the swap shift.

The 2–3 upshift occurs in two steps: an intermediate step and a final step. The intermediate step is effected by applying the reaction brake for the multiple-ratio gear unit. The final step occurs at a later instant as the reaction brake for the simple planetary gear unit is applied. During the intermediate step, the brake decelerates the sun gears for the multiple-ratio gear unit, thereby managing the rotary inertia forces so that the 2–3 upshift can occur with minimal inertia torque disturbance.

In order to avoid drift-on of the clutch used to effect fourth ratio operation, a separate fluid pressure exhaust circuit for the reaction brake of the multiple-ratio gear unit and an independent pressure distributor circuit for the clutch are provided. Thus, the clutch does not experience a pressure buildup (or a drift-on condition) as fluid is exhausted from the release side of the brake during the intermediate step of the 2–3 upshift sequence.

The exhaust circuit for the clutch that is engaged during fourth ratio operation includes an exhaust port located in a pressure modifier valve. The pressure modifier valve has the additional function of boosting pressure made available to the clutch during application of the clutch as the transmission is shifted to the fourth ratio. The provision of an independent exhaust circuit for the clutch and the modification of the pressure made available to the clutch during clutch application increases the rate of response of the clutch to a command by the electronic controller to engage the clutch. This also increases the rate of response of the clutch to a command to exhaust or release the clutch. The commands to effect engagement and release of the clutch and application and release of the brakes are developed by variable-force solenoids that are under the control of the microprocessor controller, which receives input control signals corresponding to powertrain operating variables.

BRIEF DESCRIPTION OF THE DRAWINGS

FIGS. 10 and 10a show the valve system wherein the valve elements are conditioned for fourth ratio operation; and FIG. 11 is a detailed schematic view of a pressure modifier valve that forms a part of the valve circuit illustrated in FIGS. 7–10a.

BEST MODE FOR CARRYING OUT THE INVENTION

In FIGS. 1–4, a first multiple-ratio planetary gear unit is shown at 10, and a second simple planetary gear unit is shown at 12. A driven shaft 14 is connected to the vehicle traction wheels through the usual drive shaft and differential and axle assembly. An engine-driven torque input shaft 16 drives an impeller 18 of a hydrokinetic torque converter 20. A turbine 22 of the torque converter 20 drives driven shaft 24, which is connected to the carrier of the simple planetary gear unit 12. The carrier, shown at 26, can be clutched to sun gear 28 by a coast clutch 30 ($CL_1$) to accommodate coasting torque through the driveline. Ring gear 32 is connected to intermediate shaft 34 between the gear units 10 and 12.

The ring gear 32 and the carrier 16 are connected drivably by an overrunning coupling 36 ($OWC_1$), which establishes a one-to-one driving ratio through the gear unit 12. To upshift the gear unit 12, a friction brake 38 is applied to a friction brake drum connected drivably to sun gear 44 so that sun gear 44 acts as a reaction point. Overrunning coupling 36 freewheels as the brake 38 is applied.

Intermediate shaft 34 is connected to ring gear 40 of the gear unit 10 by a forward-drive clutch 42 ($CL_3$). Sun gear 44 of the gear unit 10 is common to the sun gear 46. Both sun gears are braked by an intermediate brake 48 ($B_2$), which surrounds a brake drum that forms a part of friction clutch 50 ($CL_2$). Clutch 50 $CL_2$ connects shaft 34 to the common sun gears 44 and 46.

The torque output shaft 14 is connected directly to carrier 52 and to ring gear 54 of gear unit 10. Carrier 56 of gear unit 10 is anchored by overrunning coupling 58 ($OWC_2$). A brake band 60 ($B_3$) surrounds a brake drum that is connected to the carrier 56. Brake 60 is applied during manual-low, forward-drive operation and during reverse drive operation to provide a reaction point since overrunning coupling 58 is capable of accommodating reaction torque in only one direction.

In FIGS. 1–4, heavy lines indicate the torque delivery path through the transmission. The clutch and brake elements that are engaged to establish torque delivery have been represented by the heavy lines. The clutch and brake elements that do not carry torque and the gearing elements that do not carry torque are represented by lighter lines.

Figure 1:
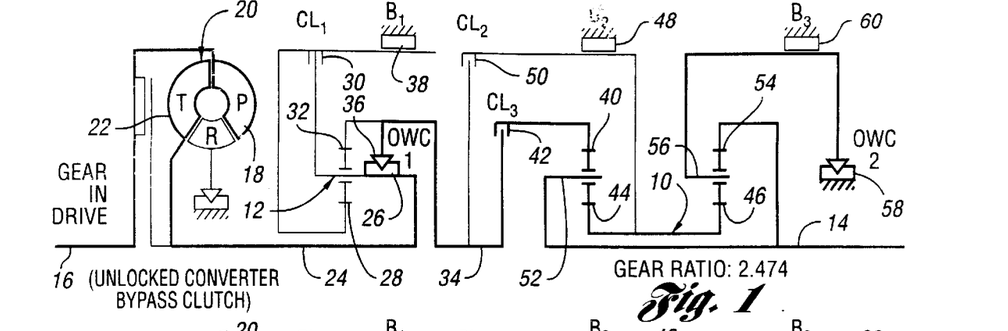
FIG. 1 is a schematic diagram of the gearing for the transmission of the present invention when the transmission is operating in the lowest or first speed ratio.

During operation in the first forward-driving ratio, engine torque is multiplied by the torque converter 20. Driven torque from the torque converter 20 is distributed through the overrunning coupling 36 and through the engaged forward-drive friction clutch 42 to the ring gear 40. Driving torque is distributed in a forward-driving direction to the carrier 52 and the torque output shaft 14. At this time, sun gears 44 and 46 rotate in a direction opposite to the direction of engine rotation.

Carrier 56 is braked by the overrunning coupling 58. Thus, positive driving torque is delivered to the ring gear 54, which drives ring gear 54 and torque output shaft 14. The ring gear torque for ring gear 54 is combined with the torque output of the carrier 52.

Figure 2:
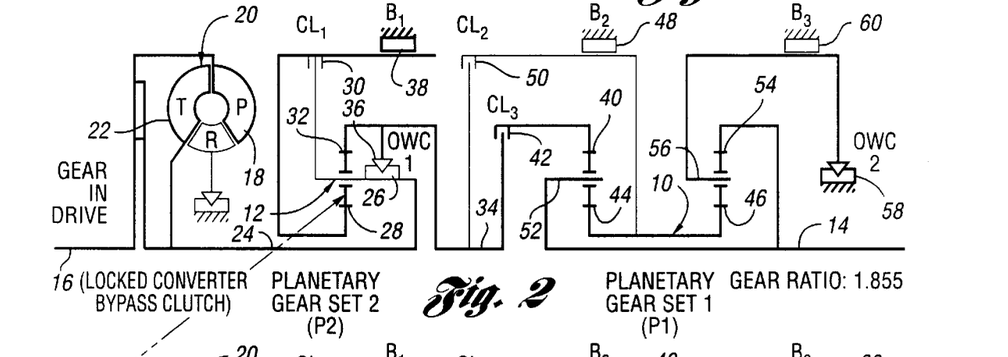
FIG. 2 is a schematic diagram of the gearing for the transmission when the transmission is shifted to the second forward-driving ratio.

An upshift from the first ratio to the second ratio is obtained by upshifting the planetary gear unit 12. This is done by engaging reaction brake 38, causing sun gear 28 to act as a reaction element. Ring gear 32 and shaft 34 thereby are overdriven.

Figure 3:
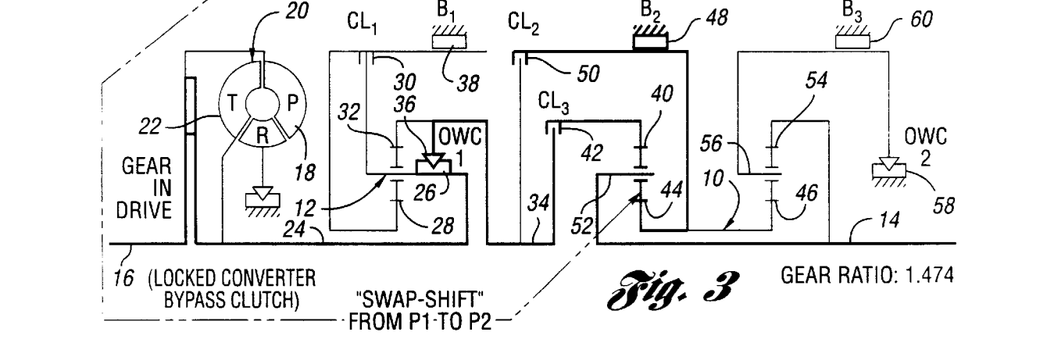
FIG. 3 is a schematic diagram of the gearing when the transmission is operating in the third gear ratio.

An upshift from the second ratio to the third ratio is obtained by applying brake 48 to anchor the sun gears 44 and 46 and by releasing reaction brake 38. Torque thus is transferred through the overrunning coupling 36 directly to the shaft 34 and then through the clutch 42 to the ring gear 40. At this time, sun gear 44 acts as a reaction element. Overrunning coupling 58 freewheels as the output shaft 14 is driven with an increased ratio relative to the second gear ratio.

Figure 4:
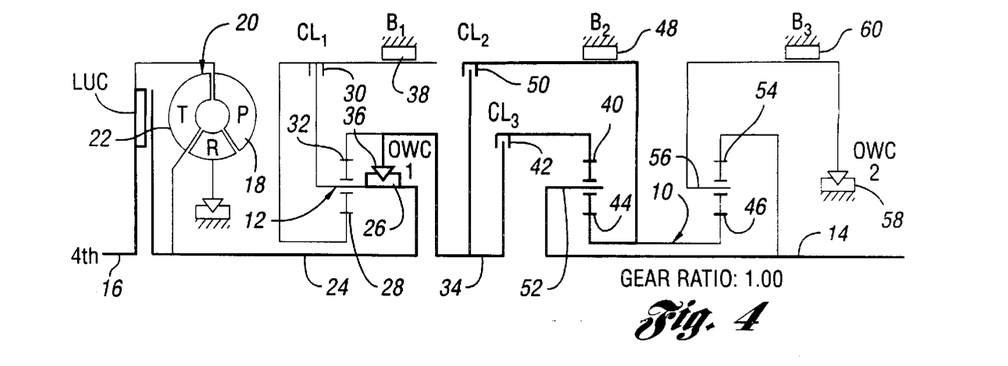
FIG. 4 is a schematic diagram of the gearing when the transmission is operating in the fourth forward-driving ratio.

Fourth gear ratio is obtained by engaging clutch 50. Engine torque then is delivered directly to the sun gear 44 through overrunning coupling 36 and engaged clutch 50. Clutch C3 also is engaged. Thus, engine torque is delivered also to the ring gear 40.

The effective gear ratio for both gear units, then, is 1:1.

The transmission is capable also of a fifth ratio, which is an overdrive ratio. This is obtained by engaging brake 38 as the clutches 50 and 42 remain applied. The schematic diagram representing fifth ratio operation is not shown since the invention can be described with reference only to the first four forward-driving ratios. Neither is a detailed description of the reverse drive operation necessary for purposes of describing the present invention. It is sufficient, for present purposes, to point out that reverse drive is obtained by applying brake 60 to anchor the carrier 56. Driving torque delivered to the sun gear 46 during reverse drive causes the ring gear 54 to rotate in a reverse direction as the carrier 56 serves as a reaction element.

Figure 5:
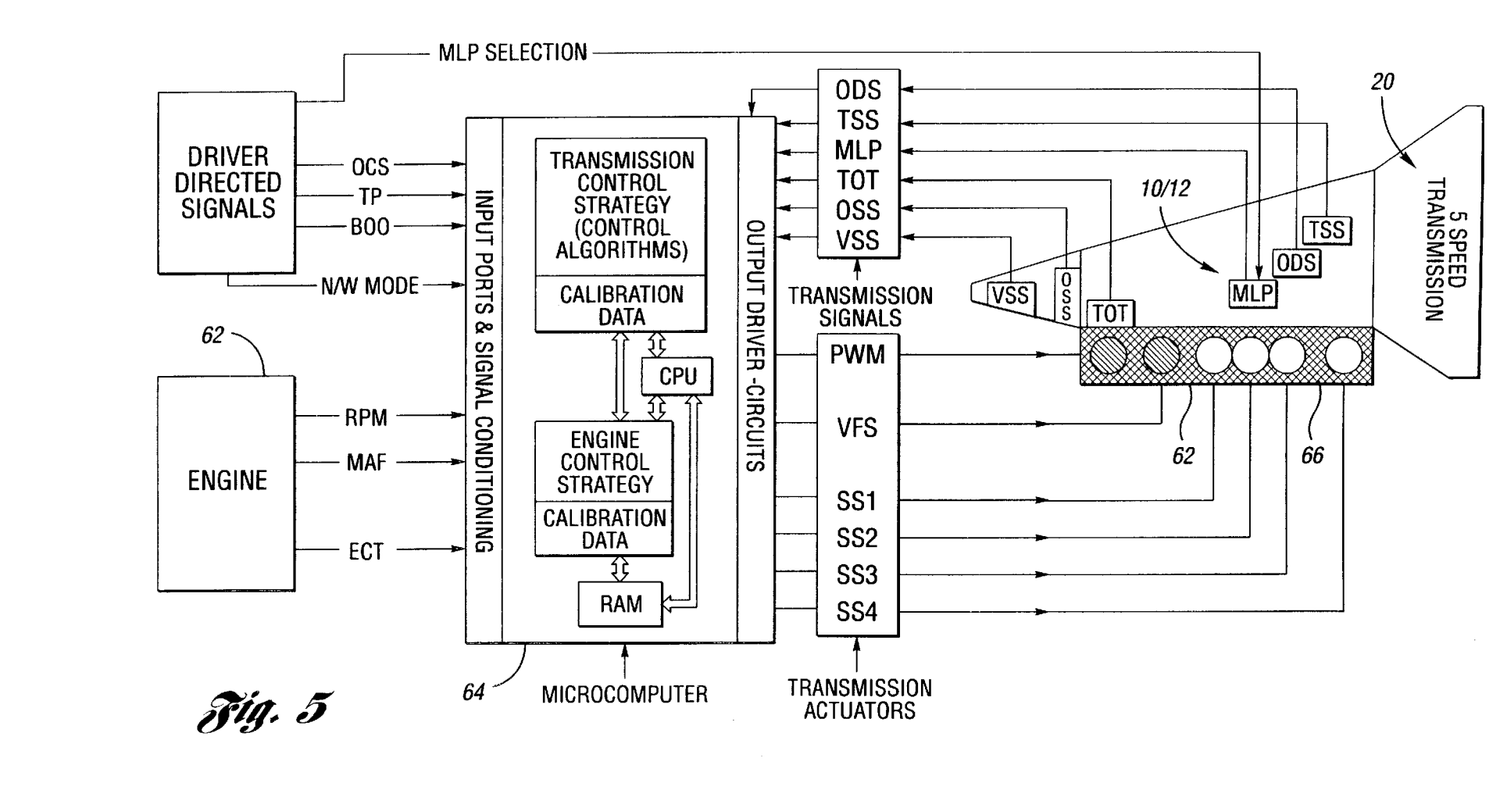
FIG. 5 is an overall block diagram of the powertrain system, which includes an engine, a multiple-ratio transmission, an electronic microcomputer with a microprocessor that establishes transmission actuator signals and that receives signals corresponding to powertrain variables.

FIG. 5 shows the overall powertrain. The engine for the powertrain is schematically shown in FIG. 5 at 62. The microcomputer 64, which controls the clutch and brake actuators, includes memory portions (ROM) that contain transmission control strategy and control algorithms as well as engine control strategy. A control processor unit (CPU) uses data including input information stored in RAM memory portions.

Engine operating parameters such as engine rpm, mass air flow and engine coolant temperature, are delivered to the input port sections of the microcomputer. Similarly, driver-directed signals such as an overdrive cancel signal, a throttle position signal and a brake on/off switch output are delivered to the input ports. A manual lever position selector signal is delivered to the transmission 10/12. A manual lever position feedback signal from manual lever position sensor MLP is delivered to the computer as shown.

The other transmission signals delivered to the computer are a turbine speed sensor signal TSS, an overdrive sensor signal ODS, a transmission oil temperature signal TOT, an output shaft speed sensor signal OSS, and a vehicle speed signal VSS. Signals developed by the microcomputer are delivered to the output driver circuit. These include a pulse width modulated signal to pressure control pulse width modulator valves in the valve body for transmission control valve system 66. Other transmission actuator signals developed by the microcomputer 64 are variable-force solenoid signals for control of ratio changes (VFS) and shift valve signals for the ratio shift valves, which are indicated at SS1, SS2, SS3 and SS4.

An understanding of the mode of operation of the valve system 66 and the microcomputer control strategy will be aided by referring to U.S. Pat. No. 5,835,875. The disclosure of that patent is incorporated herein by reference.

Figure 6:
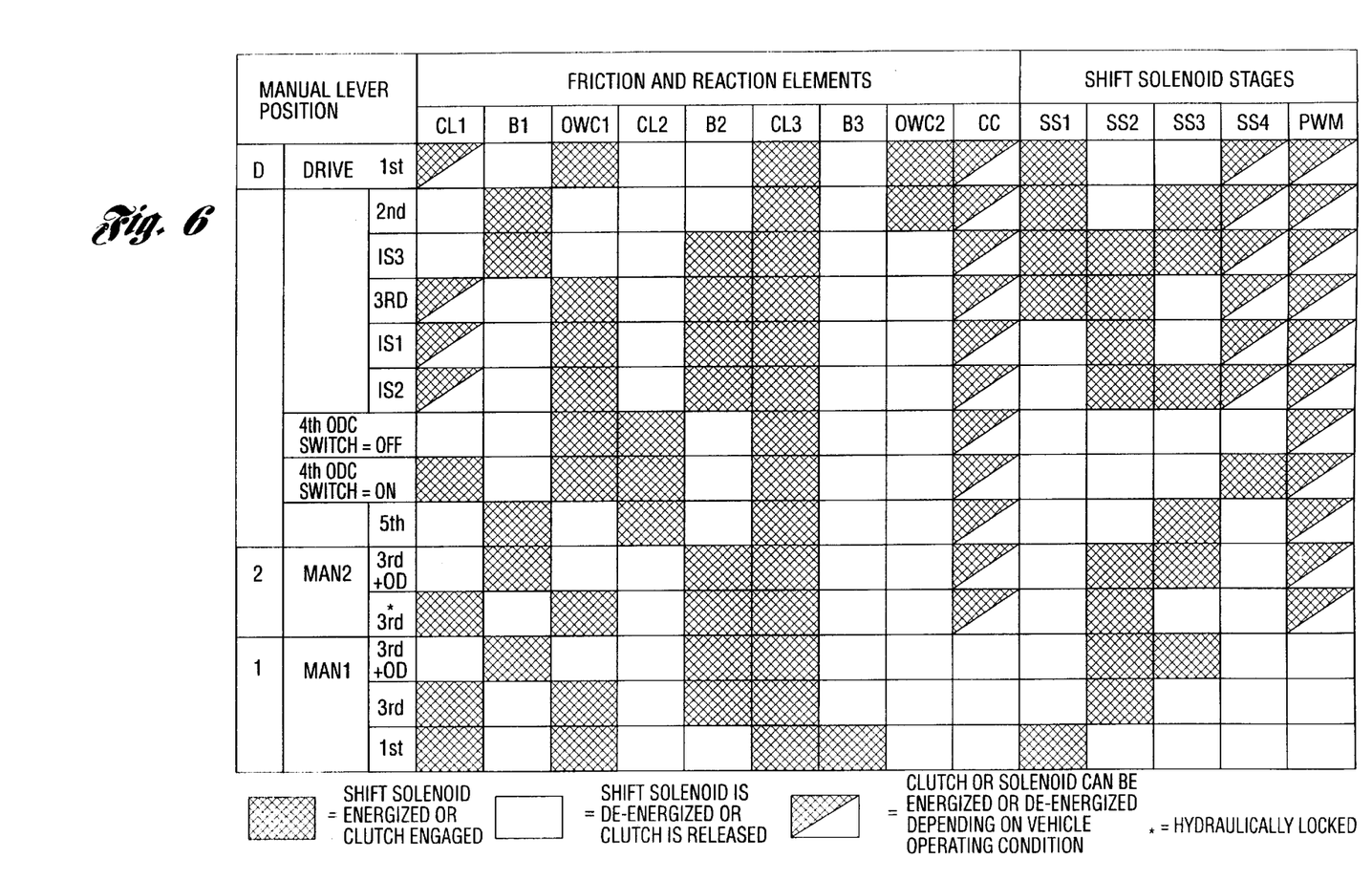
FIG. 6 is a chart showing the clutch and brake engagement and release pattern as the transmission is shifted from one forward-driving ratio to another.

FIG. 6 is a chart that summarizes the clutch and brake application and release pattern for each of the forward driving ratios, and for each of the drive ranges D, D2 and D1. The previously mentioned '875 patent includes a complete description of the function of the friction clutches and reaction elements and the various solenoid stages. For purposes of describing the present invention, however, the chart of FIG. 6 can be used to identify the clutches and brakes that should be applied and released to achieve forward drive operation in the second ratio, third ratio and the fourth ratio.

The shaded areas in the chart of FIG. 6 indicate the clutches and brakes that are applied. The blank areas indicate the clutches and brakes that are released. For example, during forward drive in the second ratio, brake B1 is applied and clutch CL3 is applied. Overrunning coupling OWC2 is active so that it delivers torque to the shaft 34 as explained previously.

During third forward-drive ratio operation, clutch OWC1 delivers torque and brake B2 and clutch CL3 are applied. During fourth ratio operation, overrunning clutch OWC1 delivers torque and clutches CL2 and CL3 are applied.

Figure 7:
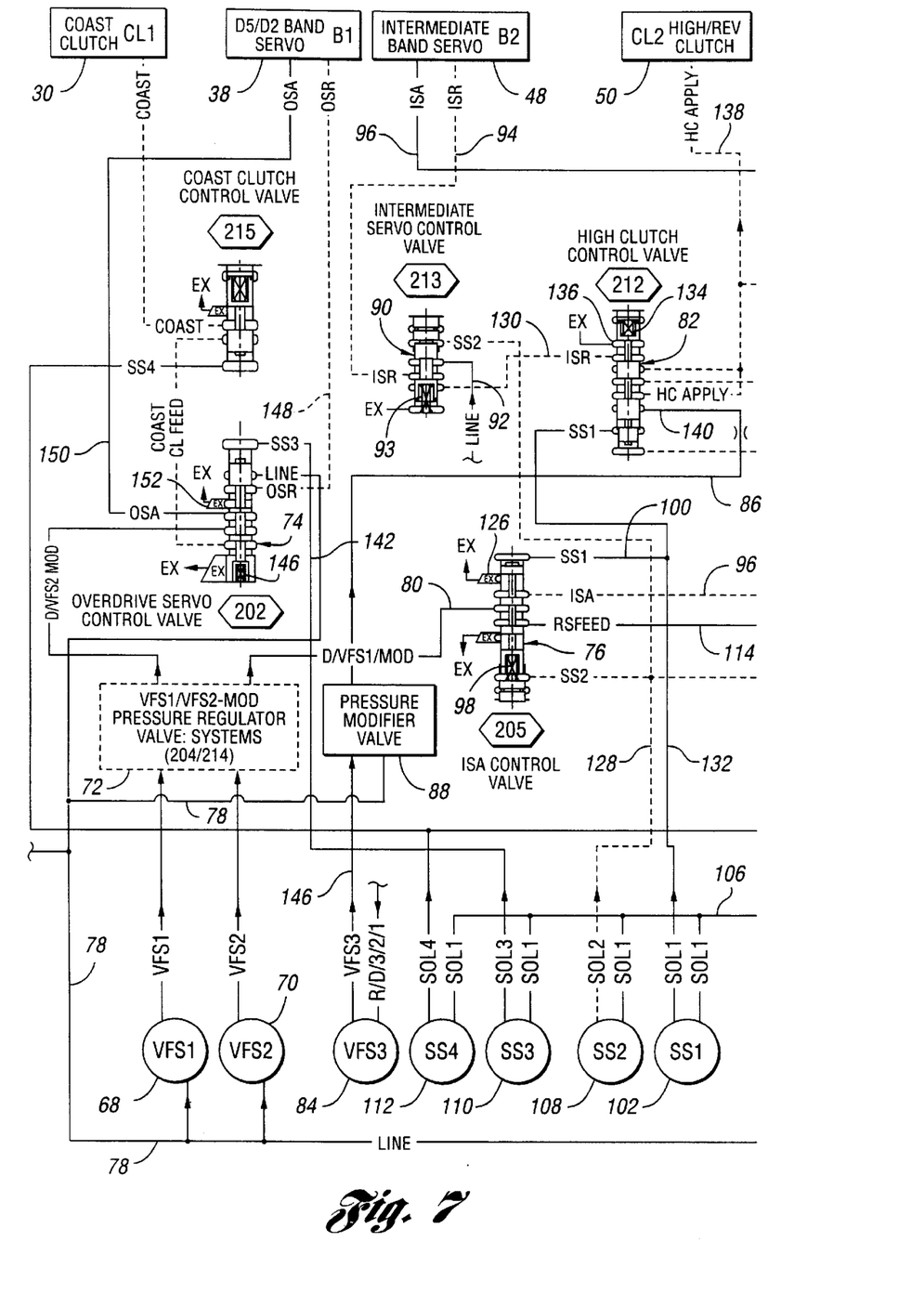
FIGS. 7 and 7a are schematic illustrations of a valve system for controlling the transmission clutches and brakes when the transmission is conditioned for operation in the second ratio.
Figure 7A:
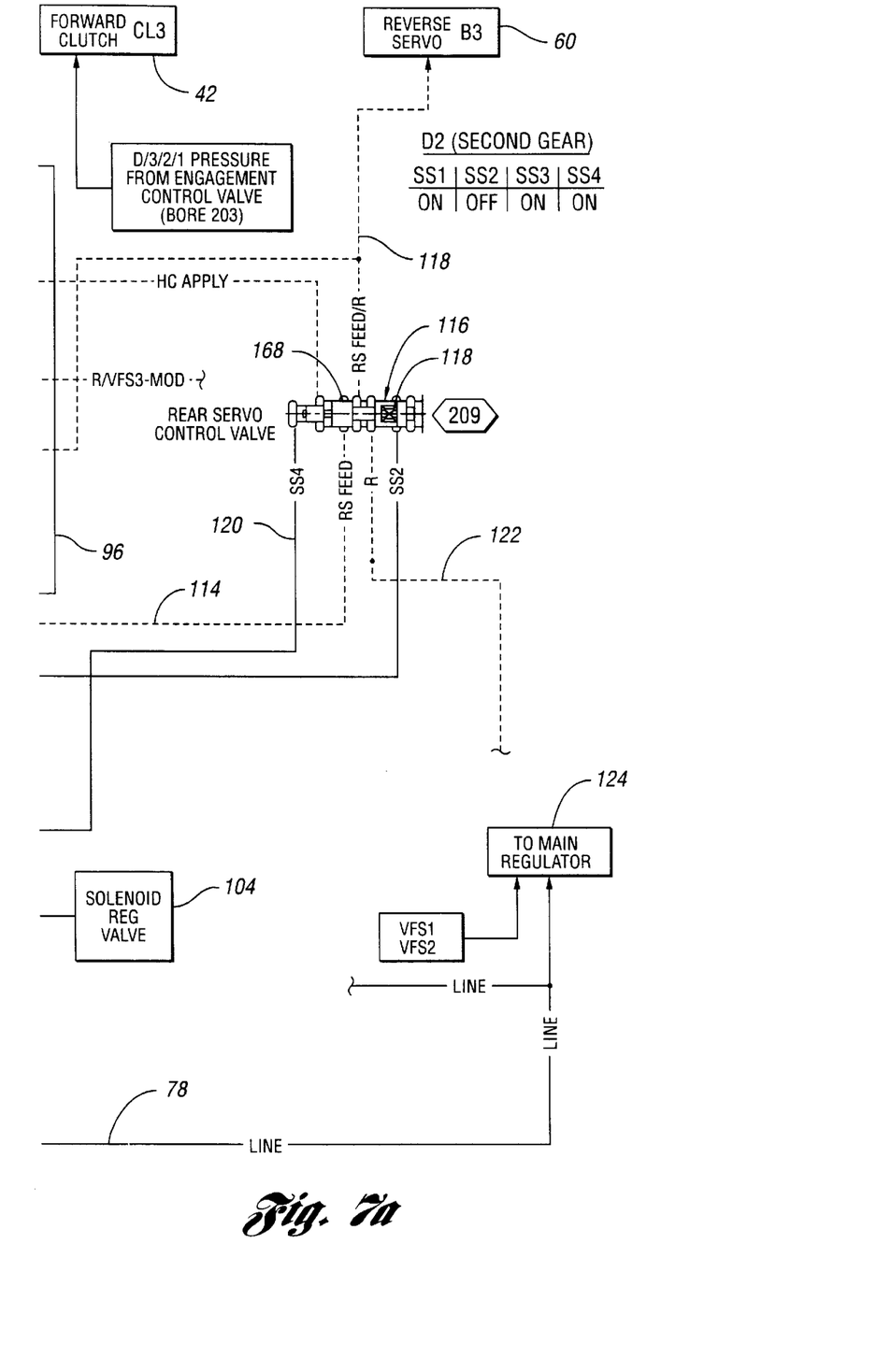

FIGS. 7 and 7a show in schematic form the valve elements of the control valve system when they are conditioned for operation in the second forward-driving ratio. The valve system includes two variable force solenoids 68 and 70. The variable force solenoids 68 and 70 deliver variable pressures to modulator valves and pressure regulator valve subsystems 72 to establish feed pressures for an overdrive servo control valve 74 and for intermediate servo apply control valve 76. Line pressure is delivered to the overdrive servo control valve 74 through line pressure passage 78. The intermediate servo control valve 76 receives modulated pressure from the variable-force solenoid VFS1 through line 80. A high clutch control valve 82 receives variable-force solenoid pressure from variable force solenoid 84 through passage 86. A pressure modifier valve 88 distributes variable-force solenoid pressure VFS3 to the passage 86. Valve 88 will be described with reference to FIG. 11.

Application and release of the intermediate brake servo 48 is controlled by the intermediate servo control valve 90. Line pressure is distributed to the intermediate servo control valve 90 through line pressure passage 92.

The intermediate brake servo 48 includes a piston that applies and releases brake 48. The piston defines an intermediate servo release pressure chamber that communicates with passage 94 and an intermediate servo apply pressure chamber that communicates with passage 96. When intermediate servo release pressure passage 94 is pressurized, fluid pressure in the intermediate servo apply pressure chamber is discharged through passage 96.

Intermediate servo apply pressure chamber 96 communicates with the intermediate servo apply control valve 76. The valve 76 is a multiple-valve land spool that is shiftable in an upward direction by valve spring 98. It is shifted in a downward direction by shift valve pressure in passage 100, which is supplied by shift solenoid SS1, shown at 102. Shift solenoid 102 (SS1) is supplied with regulated solenoid pressure from a solenoid regulator valve 104 through passage 106. Passage 106 communicates also with shift solenoids 108, 110 and 112 (SS2, SS3 and SS4, respectively).

When the valve spool for the intermediate servo apply control valve 76 moves in an upward direction, passage 80 communicates with rear servo feed passage 114. Rear servo control valve 116, when it is shifted in a right-hand direction as shown in FIG. 7a, communicates with feed passage 118 extending to the servo 60 (B3). Control signal pressure in passage 120 (SS4) is pressurized by shift solenoid 112 (SS4) seen in FIG. 7.

During reverse drive, reverse servo 60 (B3) communicates with reverse pressure passage 122 when the valve 116 assumes the position shown in FIG. 7a. At that time, passage 120 is pressurized with SS4 pressure.

When SS4 pressure is zero, valve spring 118 shifts the valve 116 in a left-hand direction, thereby connecting the rear servo feed passage 114 to the servo 60 (B3)

A main regulator valve 124 regulates line pressure in passage 78. It responds to pressure signals from variable force solenoids 68 and 70, which in turn respond to changes in powertrain variables, as mentioned previously in the description of FIG. 5. When the valve 76 is in the position shown in FIG. 7, intermediate servo apply passage 96 is exhausted through exhaust port 126. It is moved to that position by SS1 pressure in passage 100. Rear servo feed passage 114 is connected to passage 80 when SS1 pressure shifts valve 76 to the position shown.

When the intermediate servo control valve 90 assumes the position shown in FIG. 7, intermediate servo release pressure passage 94 communicates with line pressure passage 92. At that time, SS2 pressure in passage 128 is zero. When SS2 pressure shifts valve 90 in a downward direction against the force of spring 93, the intermediate servo release chamber communicates with intermediate servo release passage 130.

If pressure is present in passage 132 leading from the solenoid valve SS1, the valve 82 is shifted upwardly against the force of valve spring 134. At that time passage 130 is exhausted through exhaust port 136. The intermediate servo release pressure thus has its own exhaust circuit that is independent of the high and reverse clutch circuit for clutch 50 (CL2).

Clutch 50 (CL2) communicates with clutch apply passage 138. When the valve 82 is shifted downward by spring 134, passage 138 communicates with feed pressure passage 140, which in turn communicates with the pressure modifier valve 88. Valve 82 is shifted in a downward direction as SS1 pressure in passage 132 is reduced to zero by the shift solenoid 102.

Figure 10:
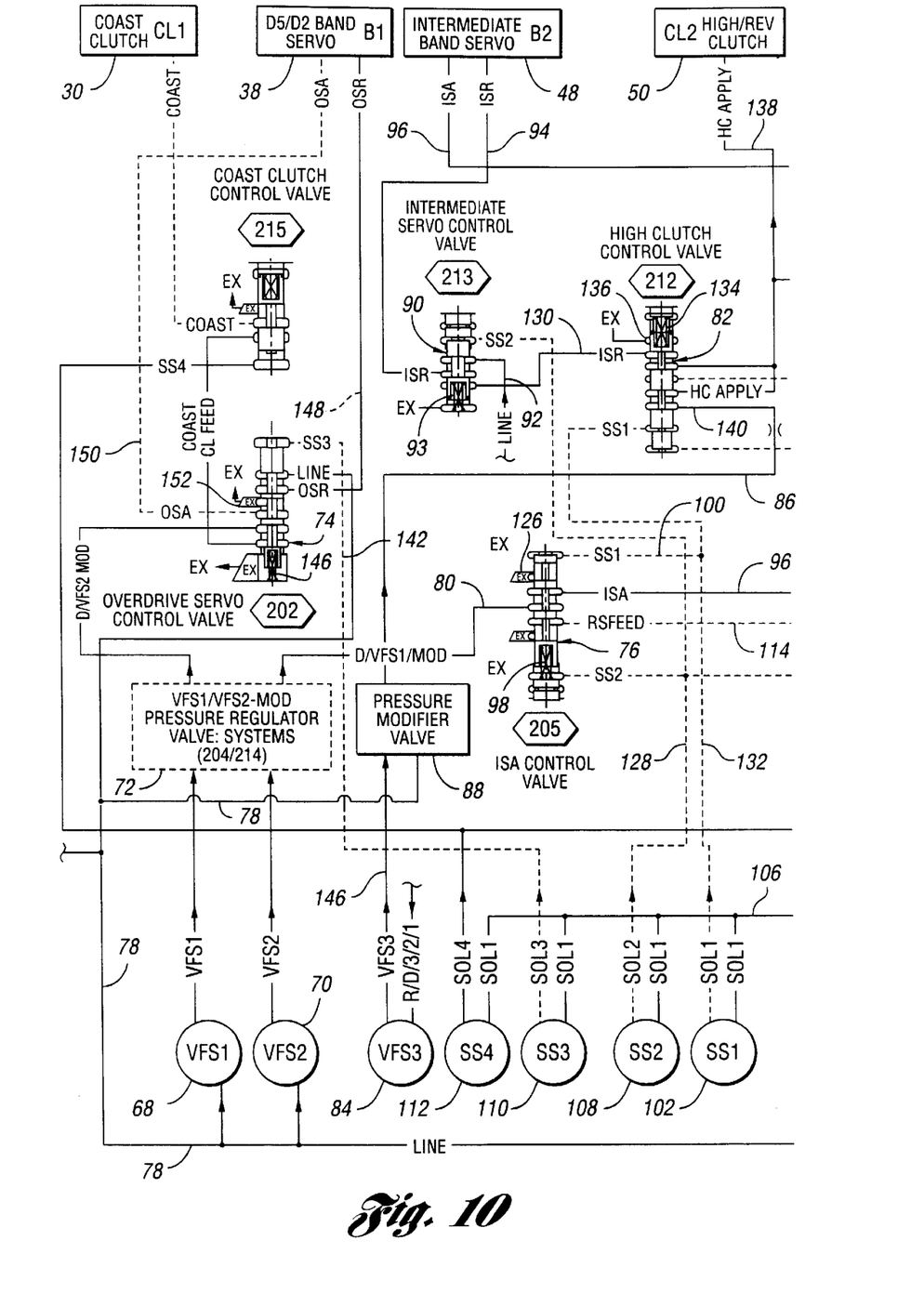
Figures 10A, 11:
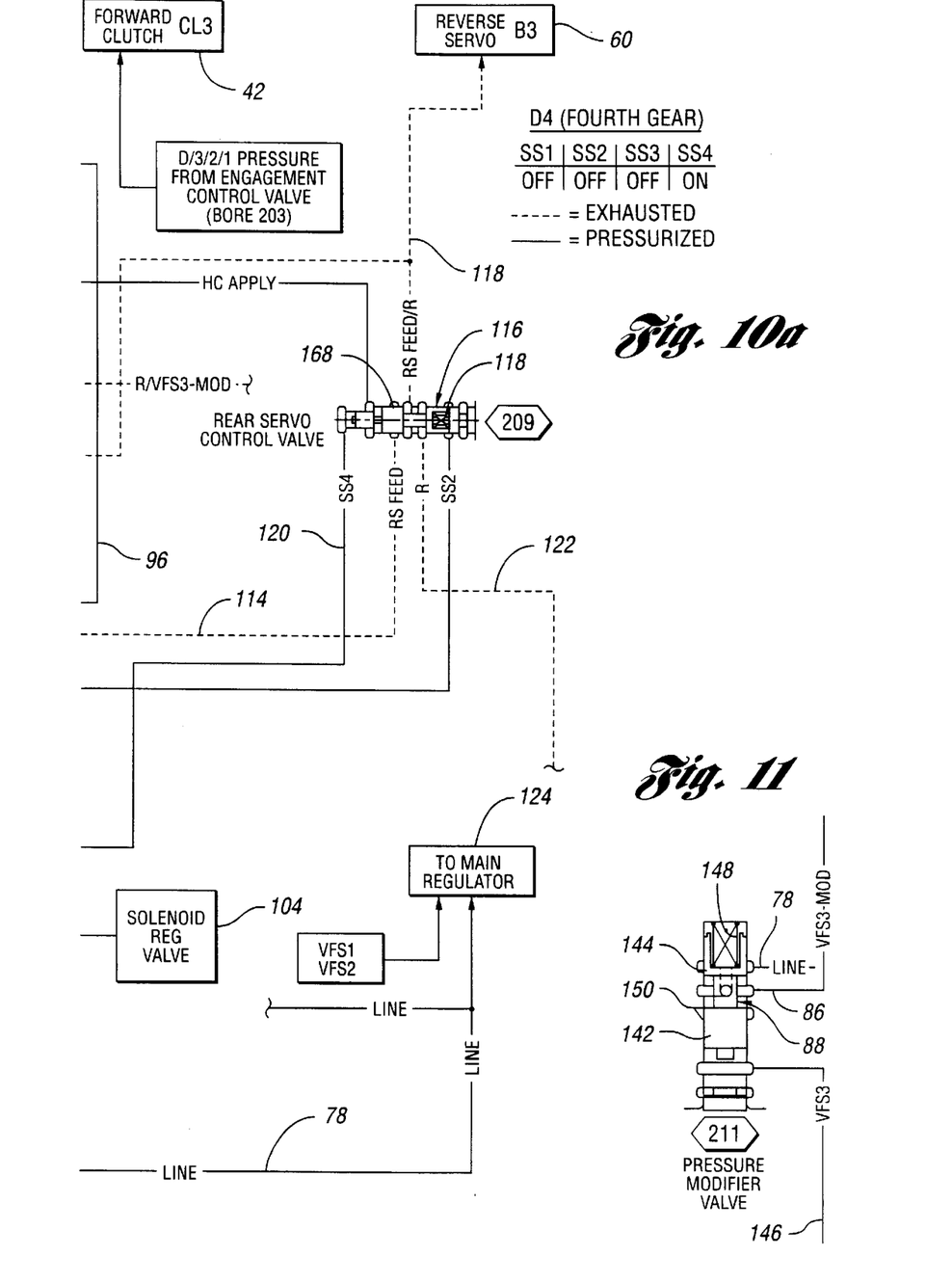

FIG. 11 shows the pressure modifier valve 88 in particular detail. It includes a valve spool with spaced valve lands 142 and 144. Pressure from variable force solenoid 84 (VFS3) is distributed through passage 146 to shift the valve 88 in an upward direction against the opposing force of spring 148. Line pressure in passage 78 is distributed to the valve 88 at a location adjacent passage 86. An exhaust port 150 in the valve 88 is located directly adjacent land 142.

When VFS3 pressure in passage 146 is zero, valve spring 148 moves the valve 88 downward, thereby exhausting passage 86 through the exhaust port 150. Thus, the high clutch 50 (CL2) has its own independent exhaust circuit through the pressure modifier valve 88.

The pressure modifier valve 88 is calibrated so that feed pressure for the high clutch 50 (CL2) in passage 86 is boosted or enhanced. When passage 146 is pressurized with VFS3 pressure, the amount of the boost or the amount of the enhancement depends upon the value of the pressure in passage 146.

As previously explained, clutch 50 (CL2) is applied during fourth ratio operation. The response of the clutch 50 to a shift command signal to achieve fourth ratio operation is reduced, thereby improving the quality of the shift from the third ratio to the fourth ratio. That shift occurs, as previously explained, when brake 48 is released and clutch 50 is applied. Further, on a 4–2 downshift, which requires release of the clutch 50 and application of the brake 38, the response to a command for a downshift is improved because of the separately calibrated exhaust orifice 150 in the pressure modifier valve 88. It is thus not necessary to compromise the timing of the release of clutch pressure from clutch 50 through the valve 88 since the exhaust flow path for the release side of the brake 38 is entirely independent of the valve 88.

Figure 8:
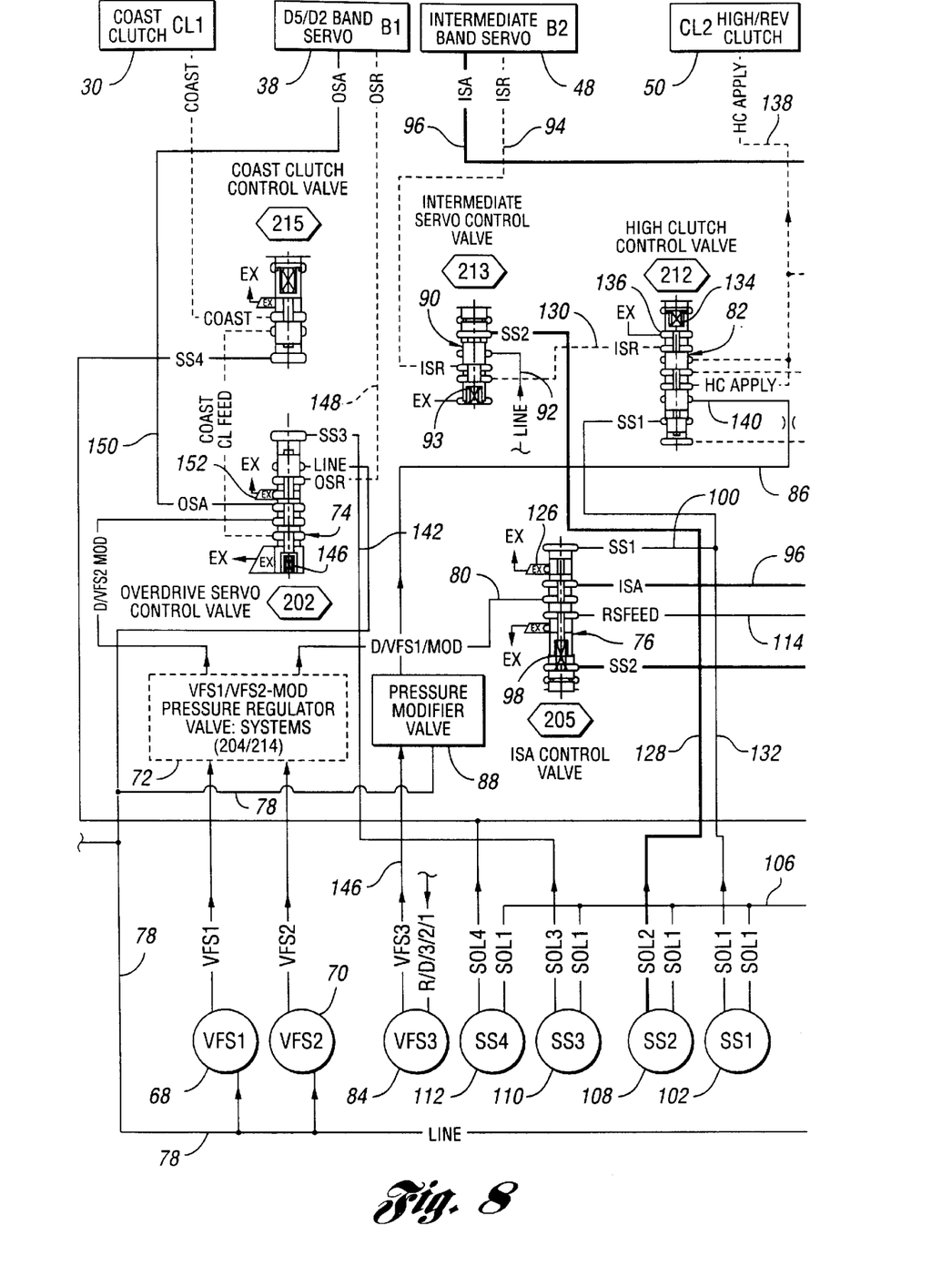
FIGS. 8 and 8a show the valve system of FIGS. 7 and 7a wherein the valve elements are conditioned for the intermediate step of a 2-3 upshift.
Figure 8A:
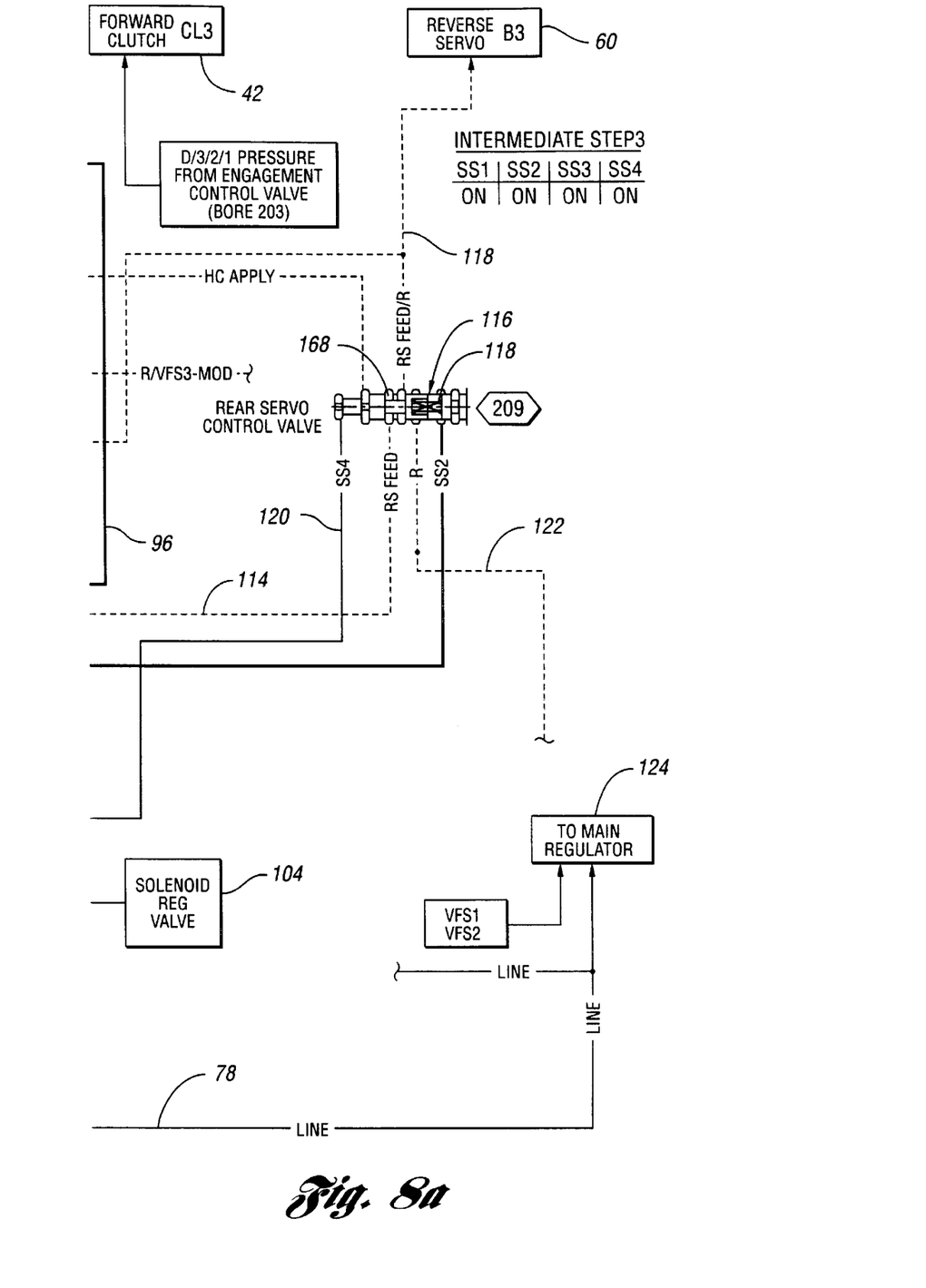
Figure 9:
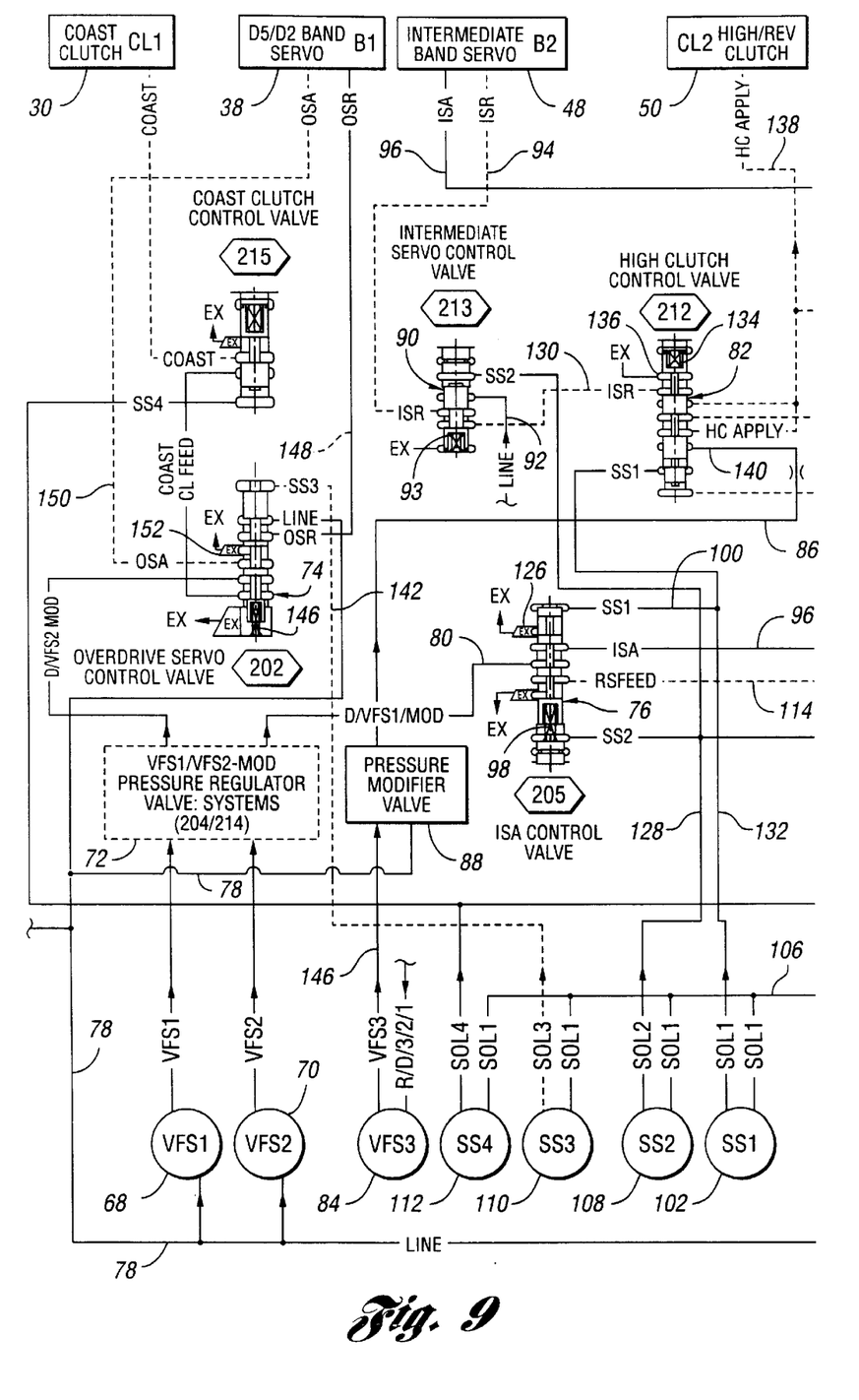
FIGS. 9 and 9a show the valve system for the transmission wherein the valve elements are conditioned for third forward-driving ratio.
Figure 9A:
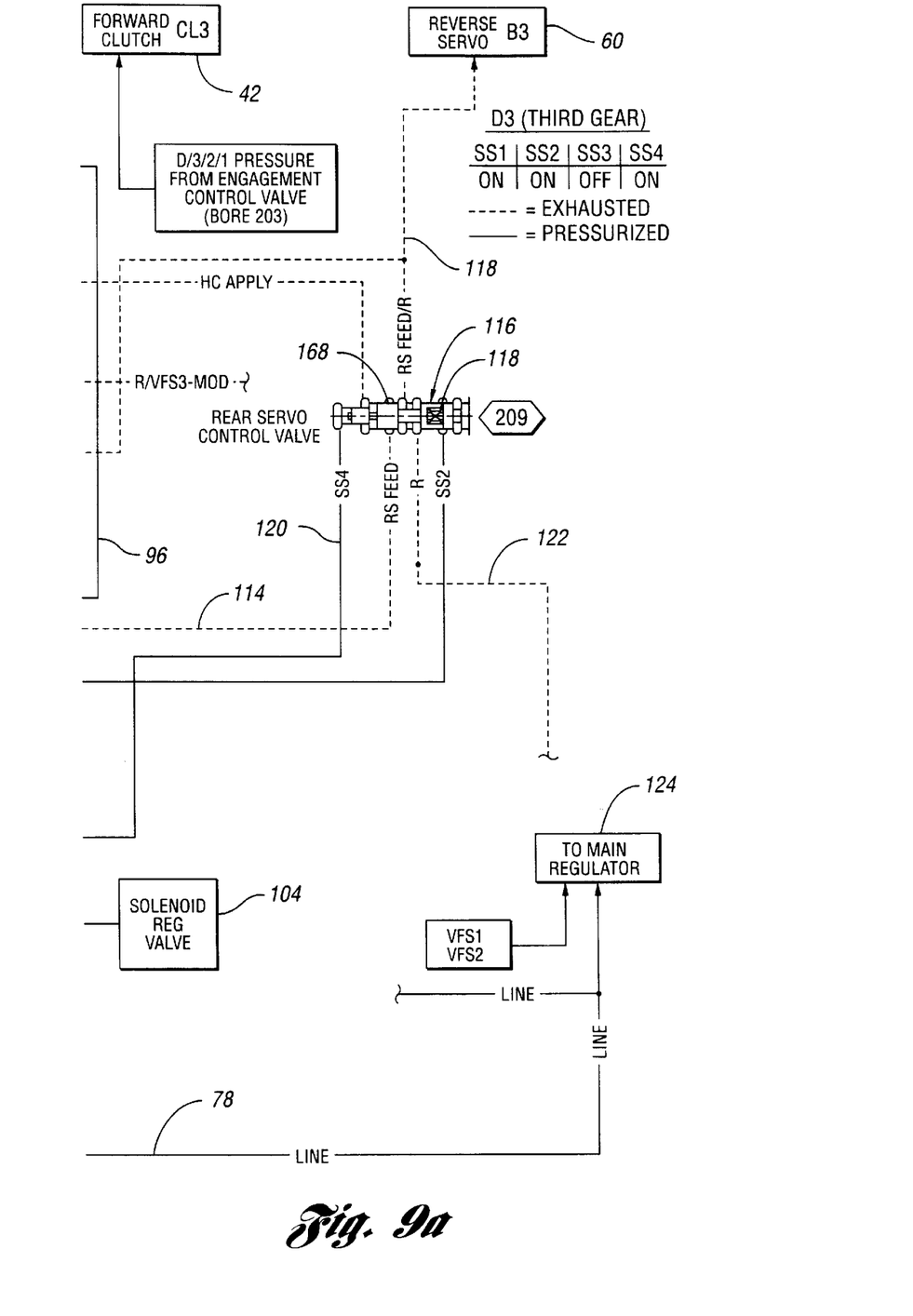

FIGS. 8 and 8a show the valve elements in the position they assume when SS2 pressure, as well as SS1 pressure and SS3 pressure and SS4 pressure, are "high". This causes the intermediate servo control valve to move downward. It also causes the intermediate servo apply control valve to move upward. This results in application of intermediate brake servo 48 (B2) at an instant before the release of brake 38. That is the intermediate step described previously. The shift is completed as brake 38 is released. This is the final step of the 2–3 upshift. The positions of the valve at this time are shown in FIGS. 9 and 9a. This final step is accomplished as SS3 pressure in passage 142 becomes zero. The valve 74 shifts upward at that time under the influence of spring 146.

Line pressure passage 78 communicates with overdrive servo release passage 148. When overdrive servo control valve 74 moves upward, overdrive servo apply passage 150 is exhausted through exhaust port 152, as indicated in FIG. 9.

FIGS. 10 and 10a show the positions of the valves during fourth ratio operation. During a 4–2 downshift, the valves will move from the position shown in FIGS. 10 and 10a to the position shown in FIGS. 7 and 7a. This requires brake 38 to be applied and clutch 50 (CL2) to be released.

When the transmission is downshifted from the fourth ratio to the second ratio, the high clutch 50 (CL2) must be exhausted through passage 138, through the high clutch control valve 82 and through passage 86 to the exhaust port 150, which is dedicated to the control of the clutch 50. This improves the response time for the release of the clutch, which is important for smooth 4–2 downshifts, especially when the transmission oil temperature is cold.

Although the best mode for carrying out the invention has been described in detail, those familiar with the art to which this invention relates will recognize various alternative embodiments for practicing the invention. All such alternative embodiments and equivalents thereof are defined by the following claims.

What is claimed is:

1. An automatic transmission and control system comprising a first multiple ratio gear unit and a second gear unit with two gear ratios, the gear units being arranged in series in a powertrain torque flow path from an engine to a driven member during operation in at least four overall underdrive ratios;

a first reaction brake for anchoring a reaction element of the second gear unit to effect an overdrive ratio of the second gear unit during operation in one overall underdrive ratio;

a second reaction brake for anchoring a reaction element of the first gear unit to effect an underdrive ratio of the first gear unit during operation in another overall underdrive ratio higher than the one overall underdrive ratio;

a pressure operated clutch for connecting together two elements of the first gear unit to effect a direct drive ratio of the first gear unit during operation in an overall direct drive ratio;

each reaction brake having an operating servo with a piston and apply and release pressure chambers on opposite sides of the piston;

control means including pressure distributor valves for selectively pressurizing and exhausting actuating pressure to the pressure chambers and to the clutch;

the control means including an electronic controller and a valve circuit, the controller establishing control signal pressures in the valve circuit in response to powertrain operating variables whereby the brake for the first gear unit is applied in advance of release of the brake for the second gear unit during a ratio change from the one underdrive ratio to the other underdrive ratio whereby the reaction element for the first gear unit is decelerated before completion of the ratio change by applying first reaction brake;

the valve circuit defining a clutch pressure passage extending to the pressure operated clutch and a pressure exhaust flow path for the release pressure chamber of the second reaction brake that is separate from the clutch pressure passage whereby drifting of the clutch to an apply state is avoided during the ratio change.

2. The transmission and control system set forth in claim 1 wherein the valve circuit comprises a clutch control valve with two operating positions;

the clutch control valve responding to a control pressure signal to establish a pressure distribution passage to the clutch when the clutch control valve is in one position;

a brake exhaust port in the clutch control valve, the second reaction brake pressure release chamber communicating with the brake exhaust port during application of the second reaction brake.

3. The automatic transmission and control system set forth in claim 2 wherein a ratio change from the one overall underdrive ratio to the other underdrive ratio is characterized by an intermediate ratio change step as the second reaction brake is applied and a final ratio change step as the first reaction brake is released whereby a brake swap occurs with improved smoothness as the reaction element of the first gear unit decelerates.

4. The automatic transmission and control system set forth in claim 1 wherein a ratio change from the one overall underdrive ratio to the other overall underdrive ratio is characterized by an intermediate ratio change step as the second reaction brake is applied and a final ratio change step as the first reaction brake is released whereby a brake swap occurs with improved smoothness as the reaction element of the first gear unit decelerates.

5. A control system for a powertrain having an engine and an automatic transmission, the transmission having a first multiple-ratio gear unit and a simple planetary gear unit, each gear unit having a reaction element with a pressure-operated reaction brake servo having a pressure-apply chamber and a pressure-erelease chamber;

a pressure-operated clutch for connecting together two torque delivery elements of the first gear unit when the reaction brake for the first gear unit is released;

a source of regulated line pressure;

a valve circuit for controlling distribution of pressure to the clutch and to the apply and release chambers of the reaction brakes;

a pressure modifier valve in the valve circuit between the line pressure source and the clutch for augmenting pressure at the clutch to effect an increase in the rate of application of the clutch;

the modifier valve having a clutch pressure exhaust port and a valve element with two operating positions;

the exhaust port being opened by the valve element when the valve element is in a first position, the valve element having a second pressure regulating position;

a source of control pressure that is proportional to powertrain operating variables;

the pressure modifier valve communicating with the control pressure source and the regulated line pressure source whereby pressure distributed to the clutch is augmented during clutch application thereby increasing the rate of clutch application when the modifier valve is in the second pressure regulating position;

the modifier valve opening the exhaust port to exhaust the clutch when the modifier valve is in the first position whereby the clutch exhaust flow path is independent of the brake release pressure chamber of the reaction brake for the first gear unit.

6. The control system set forth in claim 5 wherein the valve circuit comprises a clutch control valve with two operating positions;

the clutch control valve responding to a control pressure signal to establish a pressure distribution passage to the clutch when the clutch control valve is in one position;

a brake exhaust port in the clutch control valve, the second reaction brake pressure release chamber communicating with the brake exhaust port during application of the second reaction brake.

7. The control system set forth in claim 5 wherein a ratio change from the one overall underdrive ratio to the other overall underdrive ratio is characterized by an intermediate ratio change step as the second reaction brake is applied and the second reaction brake is released and a final ratio change step as the first reaction brake is released whereby a brake swap occurs with improved smoothness as the reaction element of the first gear unit decelerates.

* * * * *